United States Patent
Engeler et al.

(10) Patent No.: US 7,694,577 B2
(45) Date of Patent: Apr. 13, 2010

(54) STRAIN GAUGE

(75) Inventors: Paul Engeler, Frauenfeld (CH); Andreas Kirchheim, Winterthur (CH); Daniel Otter, Brütten (CH); Georges Schaffner, Hittnau (CH); Reinhard Staub, Herrliberg (CH); Andreas Ullrich, Stuttgart (DE)

(73) Assignee: Kistler Holding, AG, Winterthur (CH)

( * ) Notice: Subject to any disclaimer, the term of this patent is extended or adjusted under 35 U.S.C. 154(b) by 125 days.

(21) Appl. No.: 11/914,957

(22) PCT Filed: May 23, 2006

(86) PCT No.: PCT/CH2006/000271

§ 371 (c)(1),
(2), (4) Date: Nov. 20, 2007

(87) PCT Pub. No.: WO2006/125335

PCT Pub. Date: Nov. 30, 2006

(65) Prior Publication Data

US 2009/0145238 A1    Jun. 11, 2009

(30) Foreign Application Priority Data

May 26, 2005   (CH) ................................ 0909/05

(51) Int. Cl.
    *G01L 1/00*   (2006.01)
(52) U.S. Cl. ....................................................... 73/774
(58) Field of Classification Search ............... 73/774
    See application file for complete search history.

(56) References Cited

U.S. PATENT DOCUMENTS

| 4,314,481 A | | 2/1982 | Wolfer et al. | |
| 4,503,351 A | * | 3/1985 | Sonderegger et al. | 310/329 |
| 5,168,758 A | | 12/1992 | Wolfer | |
| 5,329,823 A | * | 7/1994 | Sonderegger et al. | 73/862.642 |
| 5,461,933 A | * | 10/1995 | Ives et al. | 73/862.623 |
| 5,477,729 A | * | 12/1995 | Cavalloni | 73/587 |
| 6,198,207 B1 | * | 3/2001 | Lally et al. | 310/348 |

FOREIGN PATENT DOCUMENTS

| CH | 687647 A5 | 1/1997 |
| DE | 4330808 | 3/1996 |
| DE | 19829410 | 8/1999 |

OTHER PUBLICATIONS

PCT/CH2006/000271—International Preliminary Report on Patentability, Publication Date: Nov. 20, 2006.

* cited by examiner

*Primary Examiner*—Lisa M Caputo
*Assistant Examiner*—Octavia Davis
(74) *Attorney, Agent, or Firm*—Dority & Manning, P.A.

(57) ABSTRACT

A strain gauge measures elongation and compression at a surface of a component. The strain gauge comprise a housing having a fixation configured to attach the strain gauge to the surface to be measured, a connector for contacting a measuring cable, at least two support surfaces at the housing for securely bearing on the surface to be measured. At least one of the support surfaces is provided with a transduction element and with a measuring element for measuring shearing forces. The measuring element is connected by an internally disposed cable to the connector and to a module that comprises that at least one support surface provided with the measuring element pre-assembled together with the transduction element.

14 Claims, 2 Drawing Sheets

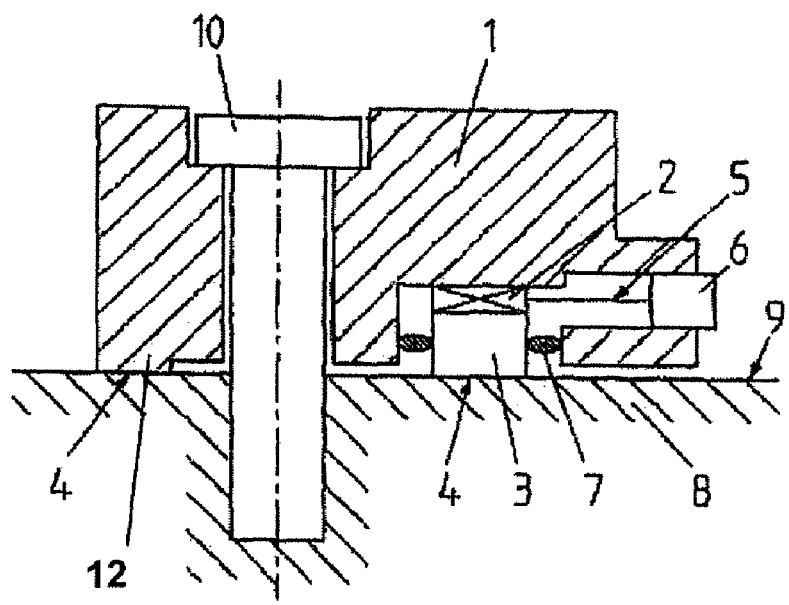
PRIOR ART  Fig. 1
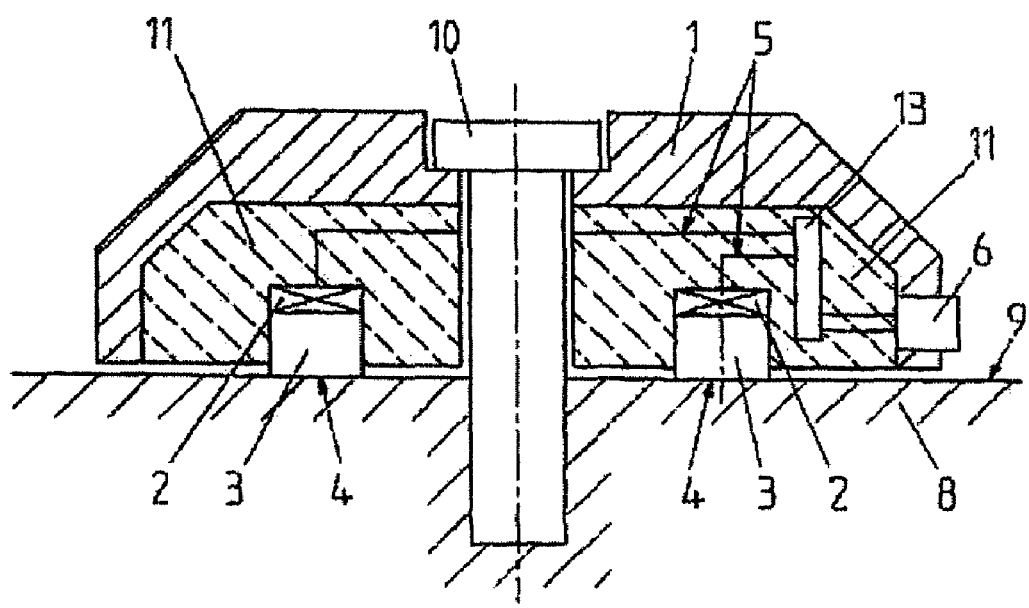
PRIOR ART  Fig. 2

STRAIN GAUGE

CROSS-REFERENCE TO RELATED APPLICATIONS

This application claims priority to Swiss Application No. CH/909/05 filed May 26, 2005 and International Application Serial No. PCT/CH2006/000271 filed May 23, 2006.

TECHNICAL FIELD

The invention relates to a strain gauge for measuring elongation and compression at a surface of a stationary body.

PRIOR ART

Strain gauges are industrially used since a long time. Sensors of this type are widely used in industry, for example for monitoring loads which act on a component. Generally, in these sensors one or two measuring elements able to measure shearing forces are assembled in a housing. This housing is attached firmly, with about 10.000 N, by means of a screw to a surface. The housing bears on this surface with a very high static friction by means of two support surfaces which on both sides are spaced apart from the screw. Each of the support surfaces may be provided with a measuring element. Due to elongation or compression of the surface in the area between these two support surfaces shearing forces occur at each measuring element which can be measured.

Known models are for example type 9233 or type 9232, both manufactured by Kistler Instrumente AG company, CH-Winterthur.

FIG. 1 shows a schematic representation of a cross section of a strain gauge type 9233 according to the prior art mounted on a surface 9 of a component 8. This strain gauge comprises a housing 1 having means of fixation 10 to this component 8, for example by using a screw. In the fixed state, this strain gauge bears on the surface 9 of the component at two support surfaces 4. In this example, one of the support surfaces 4 consists of a transduction element 3. A measuring element 2 is arranged between the transduction element 3 and the housing 1. This measuring element 2 is able to measure shearing forces which occur and to conduct the corresponding measurement signal via a cabling 5 provided for this purpose and extending through the housing 1 to a connector 6. At this connector 6 the signal can be further conducted by conventional means to an analysis device to be analyzed.

If a compression or elongation of the surface 9 of the component occurs the distance between the two support surfaces 4 of the strain gauge is changed. This requires of course that the tension force of the fixation 10 is strong enough to make the support surfaces 4 constantly adhering to the surface 9 by static friction.

If the spacing between the two support surfaces 4 of the strain gauge is altered the transduction element 3 transmits shearing forces to the measuring element 2 clamped between the housing 1 and the transduction element 3 which in turn sends a corresponding signal via the cabling 5 to the connector 6.

In type 9233 the measuring element is welded inside the housing thereby protecting the measuring element and the electronic component connected thereto from external influences, in particular from dirt, oils or liquids. To protect the measuring element 2 as well as the cabling 5 from external influences and to attach the transduction element 3 to the housing 1 the transduction element 3 is welded to the housing 1 at a welding site 7. This provides a sealed interior space within the housing 1 protected from external influences such as gases and/or liquids. This welding is very complex and therefore unsuitable for small quantities because in this case the sensor would become very expensive.

In this example only one support surface 4 is equipped with a measuring element 2; the other support surface 4 is only a dummy 12 and therefore merely serves for attachment to the surface 9 of the component by means of static friction.

FIG. 2 shows a schematic representation of a cross section of a strain gauge type 9232 according to the prior art mounted on a surface 9 of a component 8. As in the example shown in FIG. 1 also this embodiment is provided with a housing 1, a fixation 10, two spaced apart support surfaces 4 as well as cables 5 from each measuring element 2 to the connector 6. In this example, however, both support surfaces 4 are each equipped with a transduction element 3 and a measuring element 2. By using two measuring elements 2 a higher sensitivity is achieved. Furthermore, in this manner an acceleration compensation of a measurement in the direction of the elongation or compression, respectively, can be achieved.

Moreover, in the example shown in FIG. 2 an electronic component 13 is integrated in the housing 1 which is interconnected in the cabling 5 in front of the connector 6. It serves for example for signal pre-processing, in particular as a pre-amplifier of measurement signals.

In type 9232 the measuring elements are cast in plastic. In contrast to FIG. 1, in the embodiment shown in FIG. 2 the transduction elements 3 are not welded inside the housing 1. Instead, the measuring elements 2, the transduction elements 3, the cables 5 and at most the electronics 13 are sealed in the housing 1 by means of plastic casting in a convenient process of fabrication. The fabrication is clean, simple, and cheap. Higher temperatures, however, alter the elongation properties of the plastic since hardness is not temperature-independent. Furthermore, the plastic is sensitive to certain chemical compositions in the environment and may be damaged or partially decompose in liquids.

Strain gauges of the types shown in FIG. 1 or 2 having one or two measuring elements 2 as well as with or without electronics 13 are currently on the market.

OBJECTS AND BRIEF SUMMARY OF THE INVENTION

It is the object of the invention to suggest a strain gauge providing for simple and cost-effective assembly also in a limited-lot production while ensuring a safe inclusion of the measuring element against environmental influences by various gases and liquids.

This object has been achieved by the features of the independent claim.

The idea underlying the present invention is that the strain gauge according to the invention comprises at least one module with a support surface in which the measuring element is pre-assembled such as to be sealed therein. Said module is preferably sealingly attached to an opening of the housing so that electronic cabling accommodated by the housing is protected from environmental influences. The module is assembled at the housing in a simple manner to be secured during transport and assembly on the housing.

BRIEF DESCRIPTION OF THE DRAWINGS

In the following the invention will be explained in more detail with respect to the figures which show FIG. 1 a schematic representation of a cross section of a strain gauge type 9233 according to the prior art;

FIG. 2 a schematic representation of a cross section of a strain gauge type 9232 according to the prior art;

WAYS OF EMBODYING THE INVENTION

Figure 3:
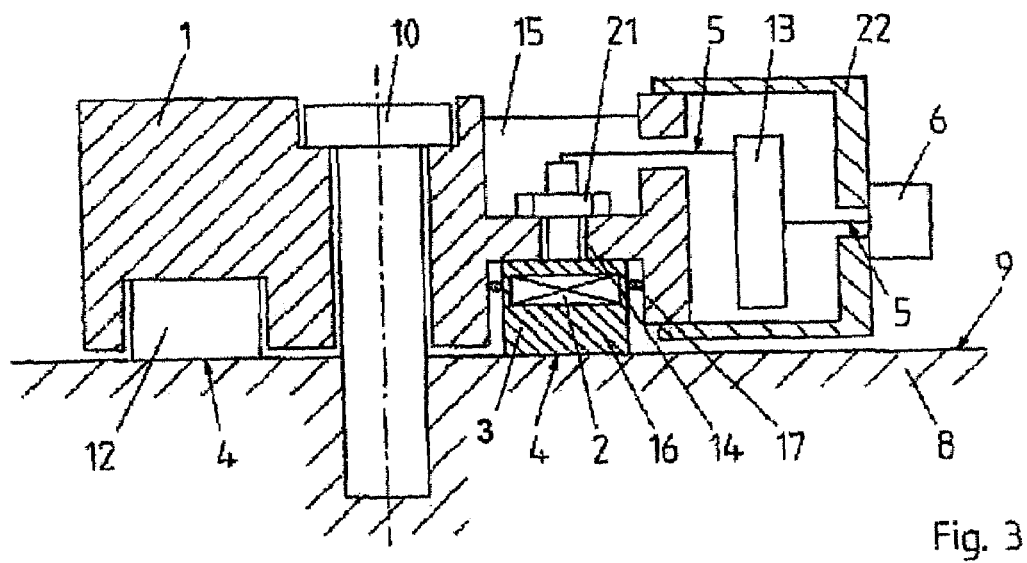
FIG. 3 a schematic representation of a cross section of a strain gauge according to the invention.

FIG. 3 shows a schematic representation of a strain gauge according to the invention in cross section. All reference numerals are identical to those in the other figures. This strain gauge also comprises a housing 1, a fixation 10, two support surfaces 4 as well as at least one transduction body 3 and a measuring element 2 in addition to cables 5 from each measuring element 2 to a connector 6. Optionally, in the interior of the housing 1 electronics 13 for signal pre-processing may additionally be connected in the cabling 5.

In this embodiment of the invention each measuring element 2 is pre-assembled together with the transduction element 3 in a module 16.

Figure 4:
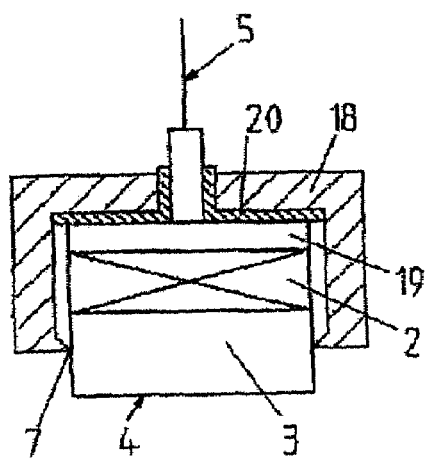
FIG. 4 a schematic representation of a cross section of a module comprising a measuring element.

FIG. 4 shows a schematic representation of a module 16 of this type in cross section. It comprises a module housing 18 having a recess in which the measuring element 2 and the transduction element 3 are at least partially inserted. On the face of the measuring element 2 opposite to the transduction element 3 there can additionally be arranged an electrode or a stopping element 19. This is insulated from the module housing 18 by arranging an insulation 20 between the module housing 18 and the electrode 19 with the cabling 5. The measuring element 2 is inserted into the module 16 under pre-tension and tightly sealed from the environment in the region of the transduction element 3. This may be achieved for example by welding the transduction element 3 under pre-tension in the module housing 18 at a welding site 7. Since such modules can be universally employed in different strain gauges no specialized fabrication for small quantities is required. In this manner, the production of these modules is cost-effective.

The cabling 5 extends from the measuring element 2 out of an opening in the module housing 18 provided for this purpose and can be connected to a desired connector 6 or to electronics 13. The opening in the module housing 18 for the cables 5 can also be sealed. However, this will not be necessary for most applications.

FIG. 3 shows a module 16 of this type mounted in a recess 14 in the housing 1 provided for this purpose. This recess 14 has a conduit for guiding the cabling 5 until it contacts the electronics 13 or the connector 6.

Mounting of the module 16 can be performed in different ways known to those skilled in the art. During mounting it is important, however, to tightly seal the opening of the recess 14. This can be achieved for example by very planar support surfaces between the module 16 and the housing 1 or by applying a seal 17 between these two components.

The assembly of the module 16 itself at the housing 1 must only be tight enough that it can withstand transport and installation. In the assembled state about 10.000 N are effective via the fixation 10 between the housing 1 and the surface 9 so that the module 16 is automatically secured. The required installation can also be achieved for example by a pin and nut 21, by a split pin or an equivalent wherein the installation in this case is carried out from a different recess 15 in the housing 1 for the attachment of the module 16. The opening of this recess 15 can be for example covered by a plastic cast or a sealing cover.

Alternatively, the module 16 may be attached to the housing 1 also by means of a split pin, a strap, a clamp or by stapling, it may be in particular screwed, clamped, glued or fastened by welding spots. Many techniques for this purpose are known to those skilled in the art.

The electronics 13 can be housed in a space provided therefore in the housing 1 which is formed by a sleeve 22 at the edge of the housing 1 wherein to the sleeve 22 is attached the connector 6. Alternatively, the electronics 13 can also be accommodated in a different recess at the housing 1.

The second support surface 4 can be formed by a dummy 12 as in the prior art as represented in FIG. 3 or can be formed by another module 16 having a measuring element 2 in a manner analogous to FIG. 2. Advantageously, housings 1 are routinely designed for two modules 16 wherein one module 16 and a dummy 16 or two modules 16 will be installed as needed. In this way upgrading by replacing the dummy 12 with another module 16 can be easily performed.

Figure 5:
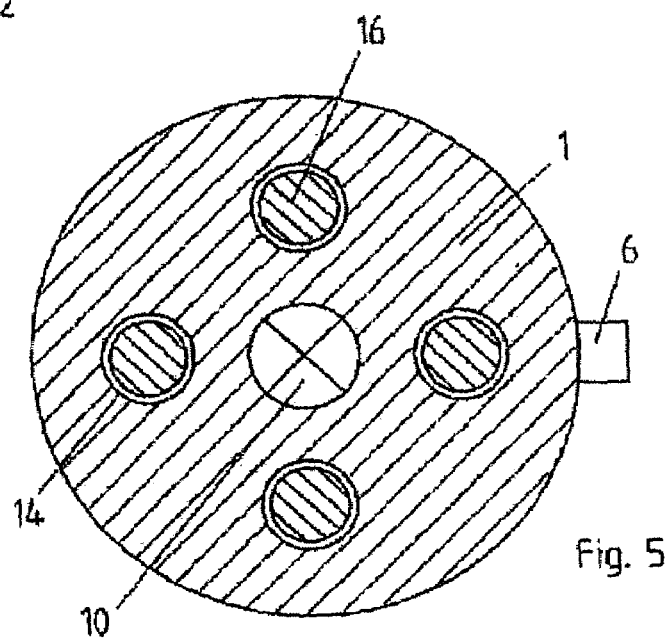
FIG. 5 a schematic representation of a top view of an arrangement of a strain gauge according to the invention having four measuring elements.

Another arrangement according to the invention is shown in FIG. 5 as a schematic representation of a top view of a strain gauge having four measuring elements 2. Shown is a housing 1, in this case in the form of a circular embodiment, comprising a fixation 10 arranged in the center and four recesses 14 arranged on a circle around the fixation 10 for inserting modules 16 as well as a connector 6. The advantage of an arrangement of this type is that depending on need up to four modules can be used thereby being able to measure the elongation in two components and, accordingly, to compensate the acceleration in two directions. In this way, the sensor becomes insensitive to temperature variations.

A ground-insulated strain gauge according to the invention can be easily fabricated by inserting a ground-insulated module 16. For this purpose, the inner structure of the module 16 must be altered so that none of the electrodes of the measuring element 2 placed on both sides makes a direct or indirect contact to the module housing 18 or to the transduction element 3. In this case the cabling 5 comprises two insulated leads.

Another advantage of a strain gauge according to the invention using modules 16 is that the modules 16 may be replaced according to need, for example to be repaired. It shall be pointed out that similar to known models the structures according to the invention can be fabricated with one, two or four modules 16 and with or without electronics 13 as well as any combination thereof.

Because these small, compact modules 16 can be universally employed only one type or a few different types of such modules must be fabricated. Due to the larger quantity of these modules the fabrication costs will be consequently lower which will also have an impact on the costs and prices of strain gauges.

LIST OF REFERENCE NUMERALS 1 housing
2 measuring element
3 transduction element
4 support surface
5 cabling
6 connector
7 welding site
8 component
9 surface of the component
10 fixation
11 cast (plastic)

12 dummy
13 electronics
14 recess in the housing
15 recess for module attachment
16 module
17 sealing
18 module housing
19 electrode, stopping element
20 insulation
21 pin and nut or equivalent
22 sleeve

The invention claimed is:

1. A strain gauge for measuring elongation and compression at a surface of a component, said strain gauge comprising a housing having a fixation configured to attach the strain gauge to the surface to be measured, a connector for contacting a measuring cable, at least two support surfaces at the housing for securely bearing on the surface to be measured wherein at least one of the support surfaces is provided with a transduction element and with a measuring element for measuring shearing forces, the measuring element being connected by means of at least one internally disposed cable to the connector, and a module that is assembled into the housing, the module being pre-assembled, the module including a module housing having a module recess in which the measuring element and the transduction element with the at least one support surface are at least partially inserted.

2. A strain gauge according to claim 1 wherein the module is detachably attached to the housing.

3. A strain gauge according to claim 1 wherein the measuring element is tightly sealed within the module.

4. A strain gauge according to claim 1 wherein the housing has at least one recess for the insertion of the module.

5. A strain gauge according to claim 4 wherein the housing has at least a second recess for the attachment of the module.

6. A strain gauge according to claim 5 wherein the second recess is tightly sealed.

7. A strain gauge according to claim 4 wherein the module is sealingly attached to the recess.

8. A strain gauge according to claim 7 wherein the seal is achieved by means of one of: an O ring, an adhesive and a planar surface.

9. A strain gauge according to claim 1 wherein the module is attached to the housing by being one of the following: screwed, clamped, glued or attached by means of welding spots to the housing.

10. A strain gauge according to claim 1 wherein at least two of the support surfaces are provided with measuring elements for measuring shearing forces together with the cables attached thereto leading to the connector.

11. A strain gauge according to claim 10 wherein the strain gauge is configured to be acceleration-compensated in the direction of elongation.

12. A strain gauge according to claim 1 comprising at least four support surfaces at the housing for securely bearing on the surface to be measured wherein each support surface is connected to a measuring element for measuring shearing forces together with at least one cable attached thereto leading to the connector.

13. A strain gauge according to claim 1 wherein the housing additionally accommodates electronics for signal pre-processing.

14. A strain gauge according to claim 1 wherein the strain gauge is configured to be ground-insulated.

* * * * *